United States Patent
Dwelley et al.

(10) Patent No.: US 9,851,772 B2
(45) Date of Patent: Dec. 26, 2017

(54) 1-WIRE BUS PD DETECTION AND CLASSIFICATION SCHEME FOR ETHERNET PODL

(71) Applicant: Linear Technology Corporation, Milpitas, CA (US)

(72) Inventors: David Dwelley, Santa Barbara, CA (US); Andrew J. Gardner, Santa Barbara, CA (US)

(73) Assignee: Linear Technology Corporation, Milpitas, CA (US)

( * ) Notice: Subject to any disclaimer, the term of this patent is extended or adjusted under 35 U.S.C. 154(b) by 296 days.

(21) Appl. No.: 14/831,632

(22) Filed: Aug. 20, 2015

(65) Prior Publication Data

US 2016/0054777 A1    Feb. 25, 2016

Related U.S. Application Data

(60) Provisional application No. 62/040,592, filed on Aug. 22, 2014.

(51) Int. Cl.
*G06F 13/00* (2006.01)
*G06F 1/00* (2006.01)
(Continued)

(52) U.S. Cl.
CPC ............ *G06F 1/3206* (2013.01); *G06F 1/263* (2013.01); *G06F 1/3287* (2013.01);
(Continued)

(58) Field of Classification Search
None
See application file for complete search history.

(56) References Cited

U.S. PATENT DOCUMENTS 5,210,846 A     5/1993  Lee
8,122,266 B2 *  2/2012  Karam ................. H04L 12/10
                                              713/300

(Continued)

FOREIGN PATENT DOCUMENTS

EP       2247026 A1     11/2010
WO    2011085703 A1      7/2011

OTHER PUBLICATIONS

EP App No. 15002497.4, "Extended EP Search Report," dated Feb. 1, 2016, 7 pages.

*Primary Examiner* — Idriss N Alrobaye
*Assistant Examiner* — Richard B Franklin
(74) *Attorney, Agent, or Firm* — Patent Law Group LLP; Brian D Ogonowsky

(57) ABSTRACT

A PoDL system includes a PSE supplying DC power and Ethernet data over a single twisted wire pair to a PD. Prior to coupling the DC voltage source to the wire pair, the PD needs to receive sufficient power to perform a detection and classification routine with the PSE to determine whether the PD is PoDL-compatible. The PSE has a low current, pull-up current source coupled to a first wire in the wire pair via a first inductor. This pull-up current charges a capacitor in the PD to a desired operating voltage, and the operating voltage is used to power a PD logic circuit. The PD logic circuit and a PSE logic circuit then control pull-down transistors to communicate detection and classification data via the first wire. After the handshaking phase, the PSE then applies the DC voltage source across the wire pair to power the PD for normal operation.

17 Claims, 5 Drawing Sheets

(51) Int. Cl.
  *G06F 1/32*    (2006.01)
  *G06F 1/26*    (2006.01)
  *G06F 13/42*   (2006.01)
  *G06F 13/40*   (2006.01)
  *H04L 12/10*   (2006.01)
  *H04L 12/40*   (2006.01)

(52) U.S. Cl.
  CPC ........ *G06F 1/3296* (2013.01); *G06F 13/4022* (2013.01); *G06F 13/4282* (2013.01); *H04L 12/10* (2013.01); *H04L 12/40045* (2013.01)

(56) References Cited

U.S. PATENT DOCUMENTS

| | | |
|---|---|---|
| 2005/0086546 A1 | 4/2005 | Darshan et al. |
| 2010/0095136 A1* | 4/2010 | Karam .................... G06F 1/266 713/300 |

* cited by examiner

| FIG. 2 |
|---|
| FIG. 2A \| FIG. 2B |

1-WIRE BUS PD DETECTION AND CLASSIFICATION SCHEME FOR ETHERNET PODL

CROSS-REFERENCE TO RELATED APPLICATIONS

This application claims priority to U.S. provisional application Ser. No. 62/040,592, filed Aug. 22, 2014, by David Dwelley and Andrew J. Gardner.

FIELD OF THE INVENTION

This invention relates to Power over Data Line (PoDL) systems, where DC power is transmitted over differential data lines. The invention more particularly relates to a detection and classification scheme for such a PoDL system so that full DC power is only transmitted by the Power Sourcing Equipment (PSE) once it is determined that the Powered Device (PD) is PoDL-compatible.

BACKGROUND

FIG. 1 illustrates a conventional PoDL system with a PSE 10 and a PD 12. The PSE 10 is shown as excluding the various AC and DC filters and the master PHY 16 (physical layer); however, the PSE 10 may alternatively be designated as including all of the circuitry on the left side of the twisted wire pair 14. The master PHY 16 is a transceiver containing conventional circuitry (e.g., transformers, amplifiers, conditioning circuits, etc.) that receives and transmits the relatively high speed Ethernet differential data and ensures that the data signals have the proper characteristics in accordance with the IEEE802.3 physical layer standards for T1 Ethernet.

The PSE 10 controls the coupling of the DC voltage $V_{IN}$, generated by a voltage source, to the PD 12.

The Ethernet differential data may be generated and received by a host processing system that may be considered part of the PSE 10.

The PD 12 is shown as excluding the various AC and DC filters and the slave PHY 18; however, the PD 12 may alternatively be designated as including all of the circuitry on the right side of the twisted wire pair 14. The slave PHY 18 may be identical to the master PHY 16 and is powered by the DC voltage $V_{IN}$ transmitted by the PSE 10. The Ethernet differential data on the PD side may be generated and received by a slave processing system that may be considered part of the PD 12. The PD 12 may contain a DC/DC converter for converting the incoming voltage to a target voltage $V_{OUT}$. The $V_{OUT}$ may be used only to power the PD 12 and slave PHY 18 or may be used to power additional equipment. The DC voltage range supplied by the PSE 10 is dictated by the IEEE802.3bu standard.

The capacitors $C_{PSE}$ and $C_{PD}$ smooth the voltages $V_{IN}$ and $V_{OUT}$.

The inductors L1, L2, L3, and L4 pass DC but block the Ethernet AC differential data, and the capacitors C1, C2, C3, and C4 pass the AC differential data but block DC. The various inductors and capacitors are referred to as a coupling/decoupling network since they couple the DC and AC to the wire pair 14 and decouple the DC and AC from the wire pair 14.

The PoDL system includes circuitry in the PSE 10 and PD 12 that performs a detection and classification routine before the PSE 10 can couple the DC voltage $V_{IN}$ to the wire pair 14. The detection and classification signals must be transmitted/received via the coupling/decoupling network. The requirements for detection and classification schemes for PoDL preclude re-using the schemes used for the much older Power over Ethernet (PoE). In PoE, at least two wire pairs in the standard CAT-5 cable are used to transmit the DC voltage and conduct the differential data signals. In a conventional PoE system, a PSE controls the magnitudes of current-limited signals on the wire pairs that are directly used by a PD to power the PD and generate a characteristic response that conveys PoE-related characteristics of the PD. Very limited information can be communicated using this conventional PoE technique. Only after the PD has conveyed that it is PoE-compatible, can the PSE couple the DC voltage source to the wire pairs to fully power the PD.

What is needed is an improved low-current detection and classification scheme for a PoDL system that can be used to rapidly convey any desired information prior the full DC voltage being coupled across the wire pair. This new detection and classification scheme specifically for use with PoDL should make use of the differences between PoDL (one wire pair) and PoE (two wire pairs).

SUMMARY

An Ethernet PoDL detection and classification scheme using the wire pair as a half-duplex, serial 1-wire data bus is disclosed. This offers significant advantages over Ethernet PoE schemes currently in use, since any amount of information may be communicated during the low-current handshaking phase. For example, the PSE/PD serial link may also be used as an auxiliary communication channel, separate from the two PHYs, prior to normal Ethernet operation in order to determine the slave PHY's maximum data rate capability as well as other parameters.

In a PoDL system, the PD requires a source of power in order to transmit its detection and classification information (or any other information) before the PSE is allowed to supply the full DC voltage via the wire pair.

In one embodiment of the invention, the PSE includes a low-magnitude, pull-up current source and a pull down MOSFET coupled to a first wire in the wire pair. The other wire in the wire pair acts as a common reference. Logic controlling the pull-down MOSFET is used to transmit data via the first wire to the PD.

In order to initially isolate the PSE's DC voltage source from the PD, a first switch in the PSE between the voltage source and the wire pair is opened. The pull-up current bypasses the first switch so is always coupled to the first wire via a first inductor (a low pass filter).

The pull-up current charges a capacitor through a rectifier in the PD, and the voltage across the capacitor is limited by a shunt regulator to, for example, 4.5 volts. This voltage is used to power PD logic circuitry that carries out the detection and classification routine. The PD logic and the PSE logic communicate via the controlling of the respective pull-down MOSFETs to complete the detection and classification routine without the need for the PSE master PHY or the PD slave PHY (the PHYs are eventually used for normal Ethernet communications via the wire pair). The communication during the handshaking phase is via the control of the pull-down MOSFETs and is of a low enough frequency to pass through the low-pass inductors of the coupling/decoupling network. In contrast, the normal Ethernet communications via the PHYs are a high frequency and pass through the high-pass capacitors of the coupling/decoupling network. Therefore, the present system creates an additional communication channel between the PSE and the PD using frequency division multiplexing.

As seen, the wire pair is used as a half-duplex 1-wire serial link during the detection and classification phase (and any additional portion of the handshaking phase), where all power for the PD logic is derived from the same pull-up current source in the PSE that is used for the transmission of data.

After a successful detection and classification routine, the first switch coupling the PSE voltage source to the wire pair is closed to fully power the PD side for normal operation of the system.

During the low power handshaking phase, the PSE may control the low power pull-up current and measure the corresponding change in voltage to determine the round trip resistance of the wire pair. This resistance may be used to adjust the PoDL voltage applied to the wire pair during normal operation to compensate for the wire pair resistance.

Other embodiments are disclosed.

BRIEF DESCRIPTION OF THE DRAWINGS

Elements that are the same or equivalent in the various figures are labeled with the same numeral.

DETAILED DESCRIPTION

An Ethernet PoDL detection and classification scheme is disclosed where a PSE and a PD communicate binary serial data over a half-duplex, 1-wire link. Data is communicated on the wire using a constant pull-up current source in the PSE and controllable pull-down MOSFETs in the PSE and PD. The PD circuitry receives power during the handshaking phase from the PSE's pull-up current charging a capacitor in the PD to an operating voltage. The 1-wire serial link uses one of the wires in the wire pair that communicates differential Ethernet data during normal operations. After a successful handshaking phase, the PSE couples a DC voltage source across the wire pair to fully power the PD during normal operation. Therefore, the system includes a novel low frequency communications channel for the handshaking phase and a conventional high frequency channel for the Ethernet data during normal operation.

Figure 2A:
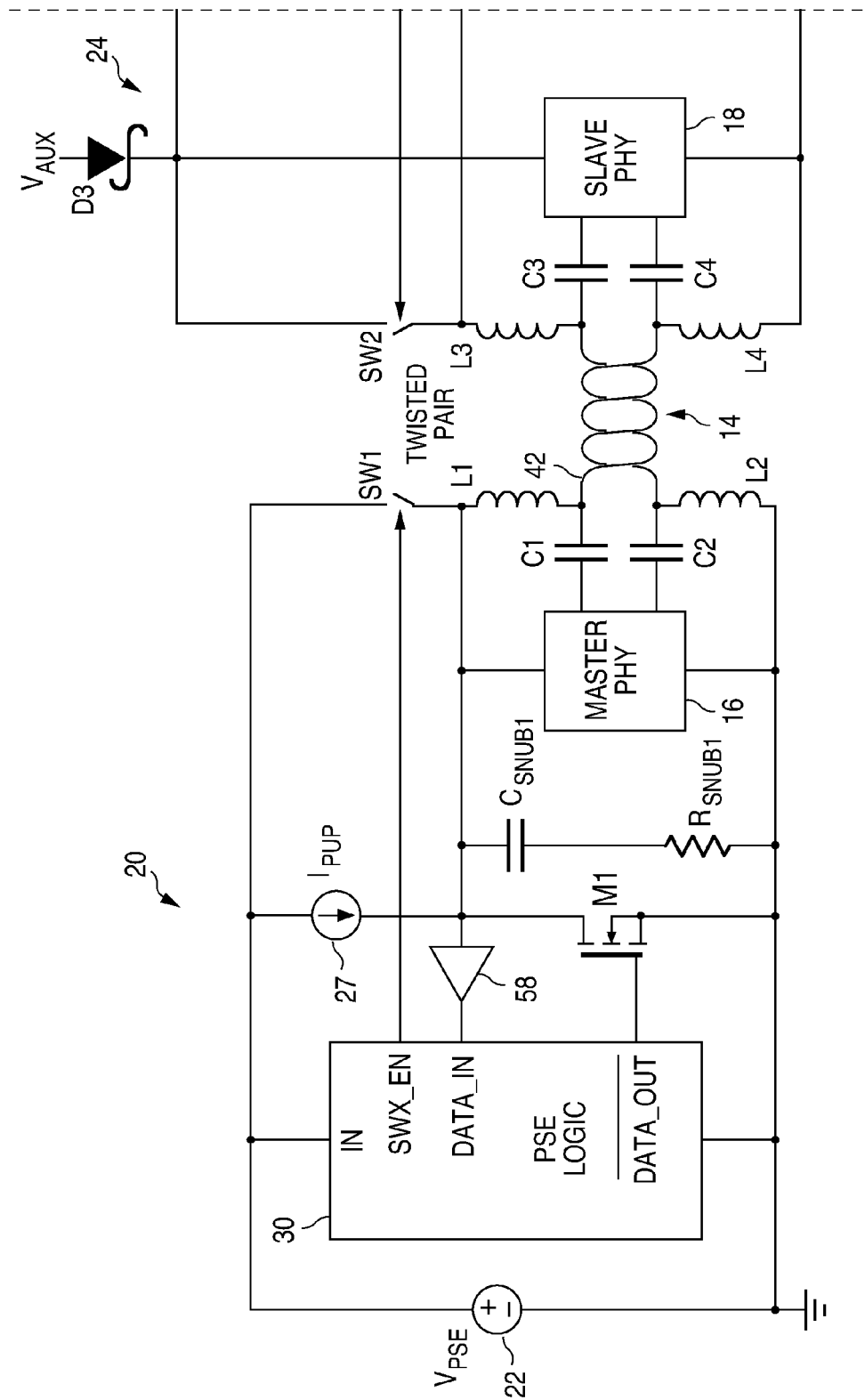
FIGS. 2A and 2B together illustrate a PoDL system in accordance with a first embodiment of the invention.
Figure 2B:
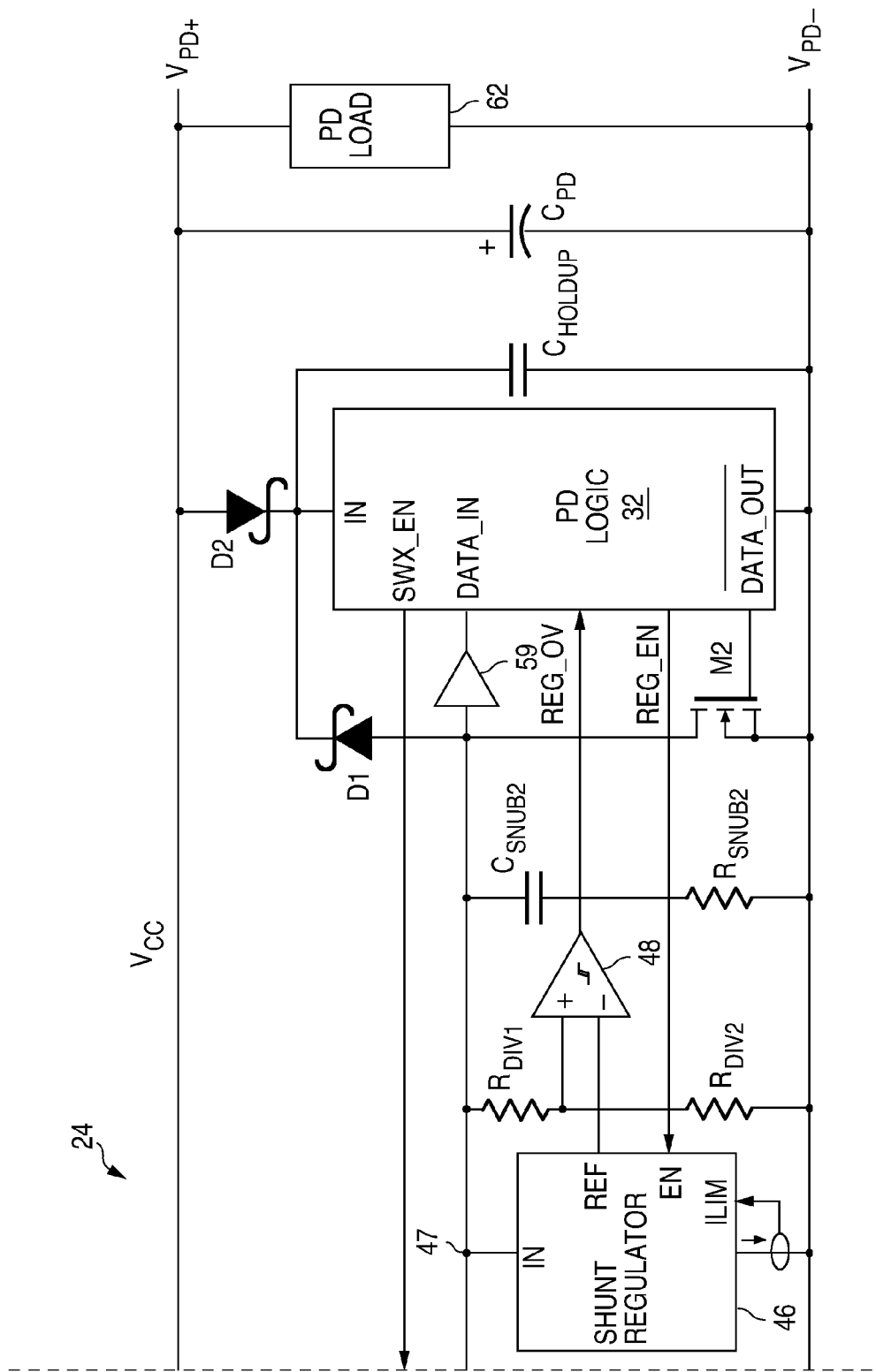

FIGS. 2A and 2B together illustrate an example of a PoDL system that makes use of one embodiment of the invention. The operation of the system of FIGS. 2A/2B will be described with respect to the flowchart of FIG. 3.

Figure 1:
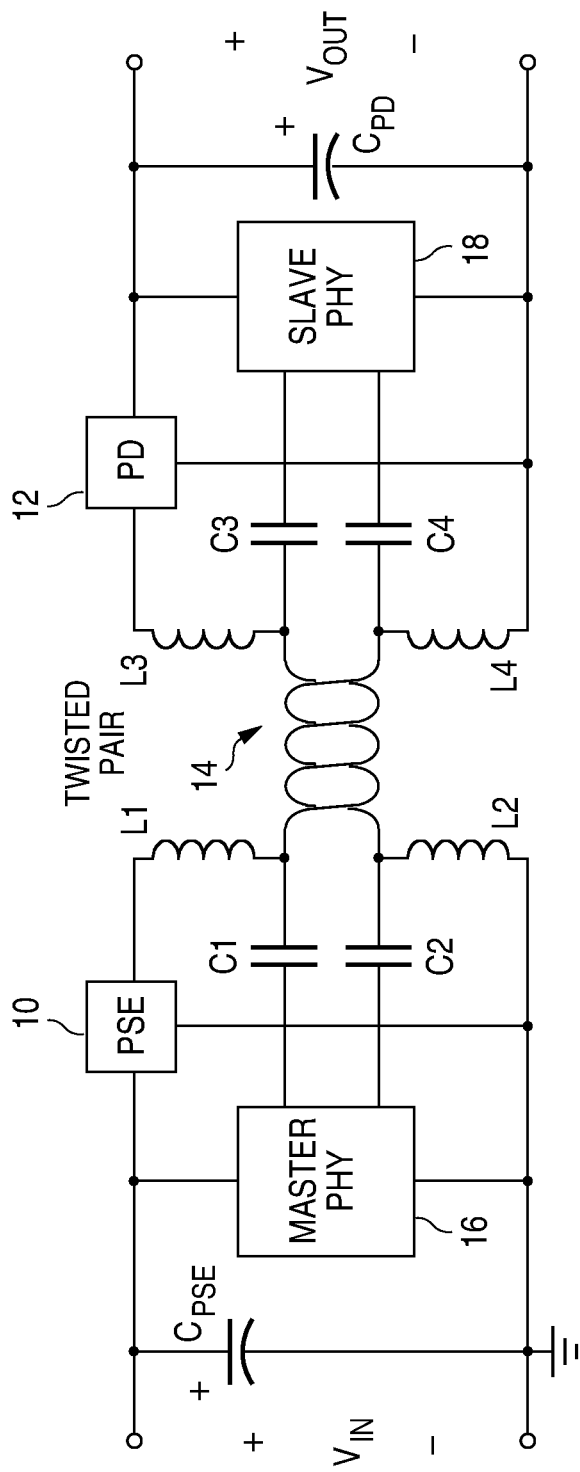
FIG. 1 illustrates a conventional PoDL system using a conventional detection and classification scheme during a handshaking phase.

The inductors L1-L4 perform the conventional passing of DC (or low frequency signals), and the capacitors C1-C4 perform the conventional passing of relatively high frequency AC differential Ethernet signals during normal operation, as discussed with respect to FIG. 1.

The PSE 20 includes a voltage source 22 that provides a PoDL voltage $V_{PSE}$. During normal operation of the PoDL system, $V_{PSE}$ is supplied to the PD 24 via the closed switch SW1, the inductors L1 and L2, the wire pair 14, the inductors L3 and L4, and the closed switch SW2. The switches SW1 and SW2 may be MOSFETs. However, the switches SW1 and SW2 cannot be closed until the system has performed a detection and classification routine that conveys the pertinent PD and PSE characteristics. If, during the detection and classification routine, the PSE 20 discovers that the PD 24 is not PoDL-compatible, the voltage $V_{PSE}$ will not be applied to the wire pair 14, and the PD must be powered locally for all functions.

The invention primarily relates to how the PD can be powered during the detection and classification phase and communicate with the PSE during this phase without the PD being powered by the $V_{PSE}$ voltage source 22.

Figure 3:
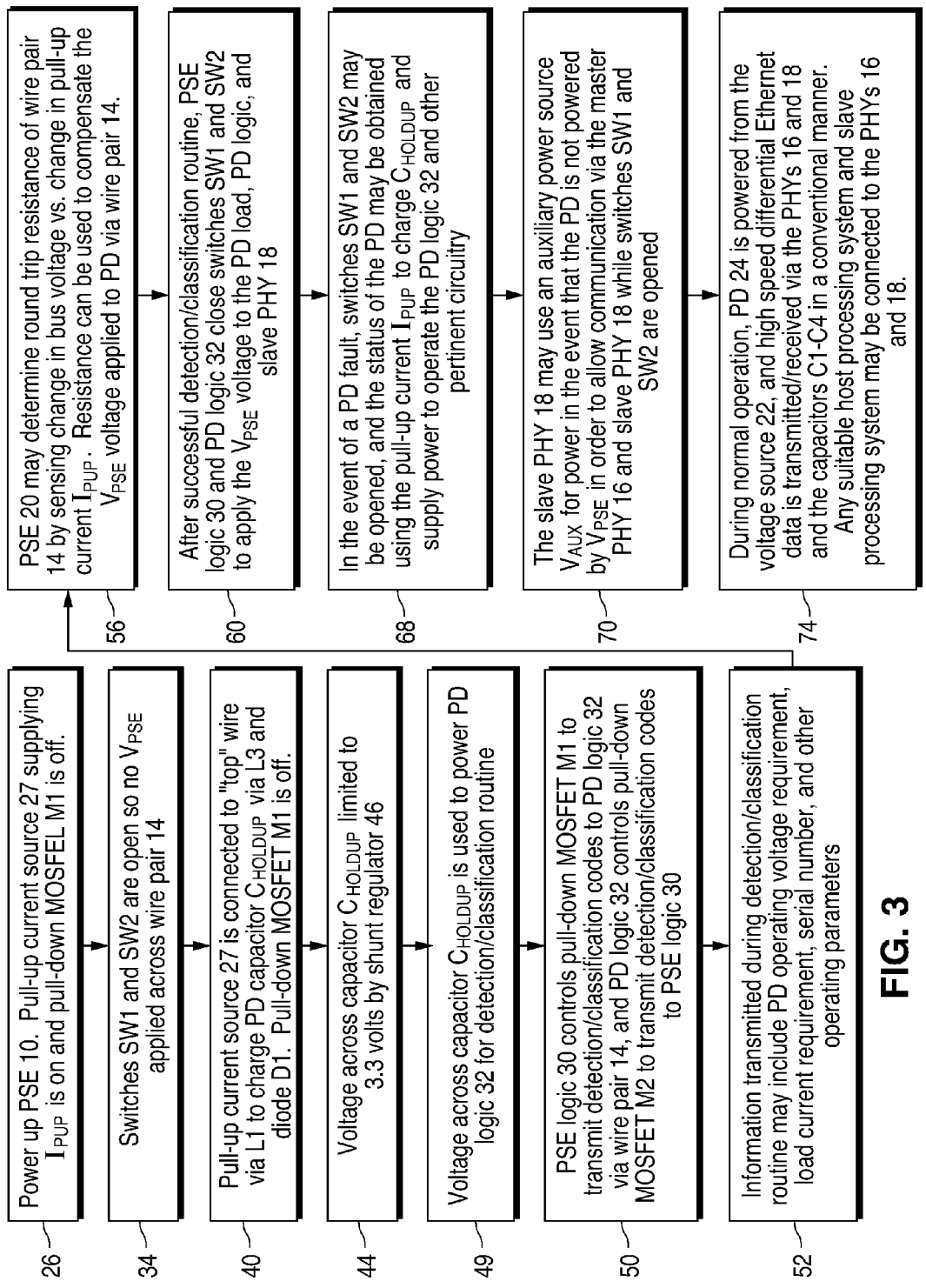
FIG. 3 is a flowchart showing steps conducted when performing a detection and classification routine using the system of FIG. 2.

In step 26 of FIG. 3, the PSE 10 is powered up. If the PoDL system is in an automobile, the powering up may occur upon turning the ignition switch.

The voltage source 22 may be used to supply power to all the circuitry in the PSE 20, or the PSE 20 may be powered by a different voltage source. In one embodiment, the voltage source 22 provides 5-12 volts. Upon powering up of the PSE 10, the pull-up current source 27 generates a low current $I_{PUP}$, such as a few milliamps. The pull-down MOSFET M1 is initially off. The MOSFET M1 is later controlled by the PSE logic 30 to transmit digital codes to the PD logic 32 to transmit detection and classification information as well as any other information during the handshaking phase.

In step 34, during the detection and classification phase, the switch SW1 is off (open). The switch SW1 is only conductive (closed) when the PSE logic 30 supplies a high signal at its SWX_EN terminal. The switch SW2 on the PD side is also open upon start-up and is only closed when the PD logic 32 supplies a high signal at its SWX_EN terminal. Therefore, at this point, the voltage source 22 is not coupled to the PD side via the wire pair 14.

In step 40, the pull-up current source 27 is coupled to the "top" wire terminal 42 via the inductor L1, and the top wire of the wire pair 14 is pulled up in voltage. The pull-up current $I_{PUP}$ charges the PD capacitor $C_{HOLDUP}$, via the inductor L3 and diode D1, and the voltage across the capacitor $C_{HOLDUP}$ ramps up. This voltage is coupled to the voltage input terminal IN of the PD logic 32.

In step 44, the shunt regulator 46 effectively detects the voltage across the capacitor $C_{HOLDUP}$ by detecting the voltage at node 47. The voltage at node 47 corresponds to a current through the shunt regulator 46. The shunt regulator 46 limits this current to a threshold current $I_{LIM}$ and, by doing so, limits the voltage across the capacitor $C_{HOLDUP}$ to a target operating voltage for powering the PD logic 32. In the example, this operating voltage is 4.5 volts.

A reference voltage REF is generated by the shunt regulator 46, and this reference voltage is compared to a divided node 47 voltage, set by resistors $R_{DIV1}$ and $R_{DIV2}$. When the voltages match, the hysteresis comparator 48 issues a signal REG_0V to the PD logic 32 signifying that the desired operating voltage has been achieved. The PD logic 32 then initiates the detection and classification routine.

During normal operation, when the full $V_{PSE}$ voltage is being applied to the PD side, the PD logic 32 disables the shunt regulator 46, via the enable terminal EN, with the signal REG_EN so the shunt regulator 46 becomes an open circuit.

Other techniques for limiting the voltage across the capacitor $C_{HOLDUP}$ can be used, such as using zener diodes.

In step 49, the shunted voltage is used to power the PD logic 32. The PD logic 32 includes circuitry for carrying out the detection and classification routine and any other handshaking routine. Such circuitry may include a processor and a memory, or a state machine, or other logic circuits that respond to any PSE inquiries and transmit the pertinent PoDL characteristics to the PSE 20.

While the PSE logic 30 and PD logic 32 are communicating while selectively pulling the wire low, via MOSFETs M1 and M2, the capacitor $C_{HOLDUP}$ provides a charge reservoir for powering the PD logic 32. Consequently, $C_{HOLDUP}$ should be large enough to minimize any droop in the target operating voltage resulting from the PD current $I_{CC}$ during the maximum required low assertion time ($t_{bus\_low(max)}$) of the bus, i.e., $$t_{bus\_low(max)} \times \frac{I_{CC}}{C_{HOLDUP}} \le V_{CC\_droop(max)}$$

The resistor/capacitor filtering networks of $C_{SNUB1}$, $R_{SNUB1}$, $C_{SNUB2}$, and $R_{SNUB2}$ are connected in shunt with the I/O ports of the PSE 20 and PD 24 and are used to damp the resonance of the inductors L1-L4 and capacitors C1-C4.

In step 50, the PSE logic 30 begins its detection/classification routine by transmitting digital codes to the PD logic 32. The serial bits are transmitted to the PD logic 32 via the 1-wire serial link by controlling the pull-down MOSFET M1, and serial bits are transmitted to the PSE logic 30 by controlling the pull-down MOSFET M2. The PSE logic 30 includes circuitry for carrying out the detection and classification routine, such as a processor and a memory, or a state machine, or other logic circuits. The PSE logic 30 transmits the pertinent PSE PoDL characteristics and inquiries to the PD logic 32 and appropriately responds to the PD logic's transmitted PoDL characteristics and inquiries. Turning on the pull down MOSFETs M1 and M2 places a logical low voltage on the top wire of the wire pair 14, while turning off the pull-down MOSFETs allows the voltage on the top wire to rise to a logical high voltage. The bit rate must be relatively slow, compared to the Ethernet bit rates, so that the bits are not filtered out by the low pass inductors L1 and L3. Even with the relatively slow bit rate, the pertinent information for the detection and classification phase may be transmitted in less than 10 ms.

Prior to initiating communication with the PD 24, the PSE 20 may choose to simply detect the presence of the PD 24 by applying the pull-up current $I_{PUP}$ and sensing the subsequent voltage $V_{BUS}$ across the wire pair 14.

In step 52, the pertinent information transmitted during the handshaking phase may include the PD's operating voltage requirement, the PD load current requirement, the serial number of the PD (or parallel PDs), and any other relevant operating parameters, including the ambient temperature of the PD 24.

In step 56, the PSE 20 may optionally determine the round trip resistance of the wire pair 14 by either controlling the pull-up current source 27 or the pull-down MOSFET M1 to supply two different current levels and measuring the resulting voltages $V_{BUS}$ across the wire pair 14. In other words, the PSE logic 30 or other circuitry in the PSE 20 may measure the total round-trip resistance between the PSE 20 and PD 24 by observing the incremental change in $V_{BUS(HI)}$ as $I_{PUP}$ is changed, as follows:

$$R_{PSE-PD} = \frac{(V_{BUS(HI),1} - V_{BUS(HI),2})}{(I_{BUS(HI),1} - I_{BUS(HI),2})}$$

The resistance can then be used by the PSE 20 to raise or lower the level of the voltage source 22 such that the optimal voltage is received at the PD 24. This may obviate the need for a DC/DC converter in the PD 24. The voltage drop along the wire pair 14 becomes very significant for long lengths of the wire pair 14.

The signals on the top wire of the wire pair 14 are supplied to the DATA_IN terminal of the PSE logic 30 via the driver 58, and the signals on the top wire of the wire pair 14 are supplied to the DATA_IN terminal of the PD logic 32 via the driver 59.

In step 60, it is assumed that the detection/classification phase has been successful and the PSE 20 is ready to supply the full voltage $V_{PSE}$ across the wire pair 14 to power the PD load 62 and all other PD circuitry. The PSE logic 30 closes the switch SW1 and the PD logic 32 closes the switch SW2 so that the full $V_{PSE}$ is supplied to the PD load 62 and all other PD circuitry via the switch SW1, the inductors L1/L2, the wire pair 14, the inductors L3/L4, and the switch SW2.

The master PHY 16 in the PSE 20 is powered by the voltage $V_{PSE}$ or another supply voltage, and the slave PHY 18 in the PD 24 is powered by the transmitted voltage $V_{PSE}$. The capacitor $C_{PD}$ across the PD load 62 smooths the voltage $V_{PSE}$. The PD load 62 may include a DC/DC converter for generating a target voltage for other circuitry in the PD load 62.

In step 68, in the event of a PD fault, where it is not desired for the PSE 20 to keep transmitting the voltage $V_{PSE}$, the PSE logic 30 and the PD logic 32 may open the switches SW1 and SW2, and the PD logic 32 may again be powered by the pull-up current source 27, as previously described, to transmit status information via the 1-wire serial bus, such as the nature of the fault (e.g. temperature fault, over-current fault, or over-voltage fault).

In step 70, the PD logic 32 and slave PHY 18 may be optionally powered by an auxiliary voltage source, via diodes D2 and D3, generating $V_{AUX}$. The auxiliary power source is not needed once the PSE 20 supplies the voltage $V_{PSE}$ to the PD 24. By using the auxiliary power source, communication between the PD 24 and PSE 20 may be carried out via the PHYs 16 and 18 while the switches SW1 and SW2 are open.

In step 74, the PD 24 is fully powered by the voltage $V_{PSE}$ and high speed differential Ethernet data may be transmitted through the wire pair 14 via the master PHY 16, the slave PHY 18, and the capacitors C1-C4. The PHY's 16 and 18 ensure the data has the correct characteristics for meeting the IEEE standards for T1 Ethernet. Any suitable host processing system and slave processing system may be coupled to the PHY's 16 and 18 for processing the Ethernet data. Since the voltage $V_{PSE}$ is DC, it is blocked by the capacitors C1-C4 so does not affect the high speed differential Ethernet data into the PHYs 16 and 18.

During the low current detection/classification phase, either the PSE 20 or PD 24 may limit the bus logic high voltage, but the preferred scheme discussed herein relies upon the PD clamping the bus voltage with the shunt regulator 46. The shunt regulator 46 may also be used to present a constant voltage signature to the PSE 20 prior to serial communication as well as providing a virtual ground for the purpose of measuring round-trip resistance between the PSE 20 and PD 24.

If an auxiliary power source is available to power the slave PHY 18, the high frequency Ethernet link (using the PHYs 16 and 18) may operate simultaneously with the low frequency PSE/PD 1-wire serial bus (not using the PHYs 16 and 18) using the principal of frequency-division multiplexing (FDM).

During the detection/classification phase, the amount of time required for the 1-wire bus voltage to rise ($t_{RISE}$) is a function of the magnitude of $I_{PUP}$ and the impedance of the PoDL decoupling network. This rise time may limit the maximum rate at which serial data may be transmitted on the 1-wire bus.

The PD may current-limit the voltage being regulated by the shunt regulator 46 on the wire pair 14 in the event the PSE 20 attempts to overdrive the bus voltage.

After the detection and classification phase, the PSE 20 applies the $V_{IN}$ voltage to the $V_{CC}$ bus, and this increase in voltage above a predefined threshold is detected by the PD 24, such as by a comparator. In response, the PD logic 32 shuts down the PD shunt regulator 46 (that limits the voltage to 4.5 volts), using the REG_EN signal, so the shunt regulator 46 becomes an open circuit during normal operation to avoid dissipating excessive power. Therefore, during normal operation, the shunt regulator 46 does not limit the voltage supplied to the Vcc bus.

Figure 4:
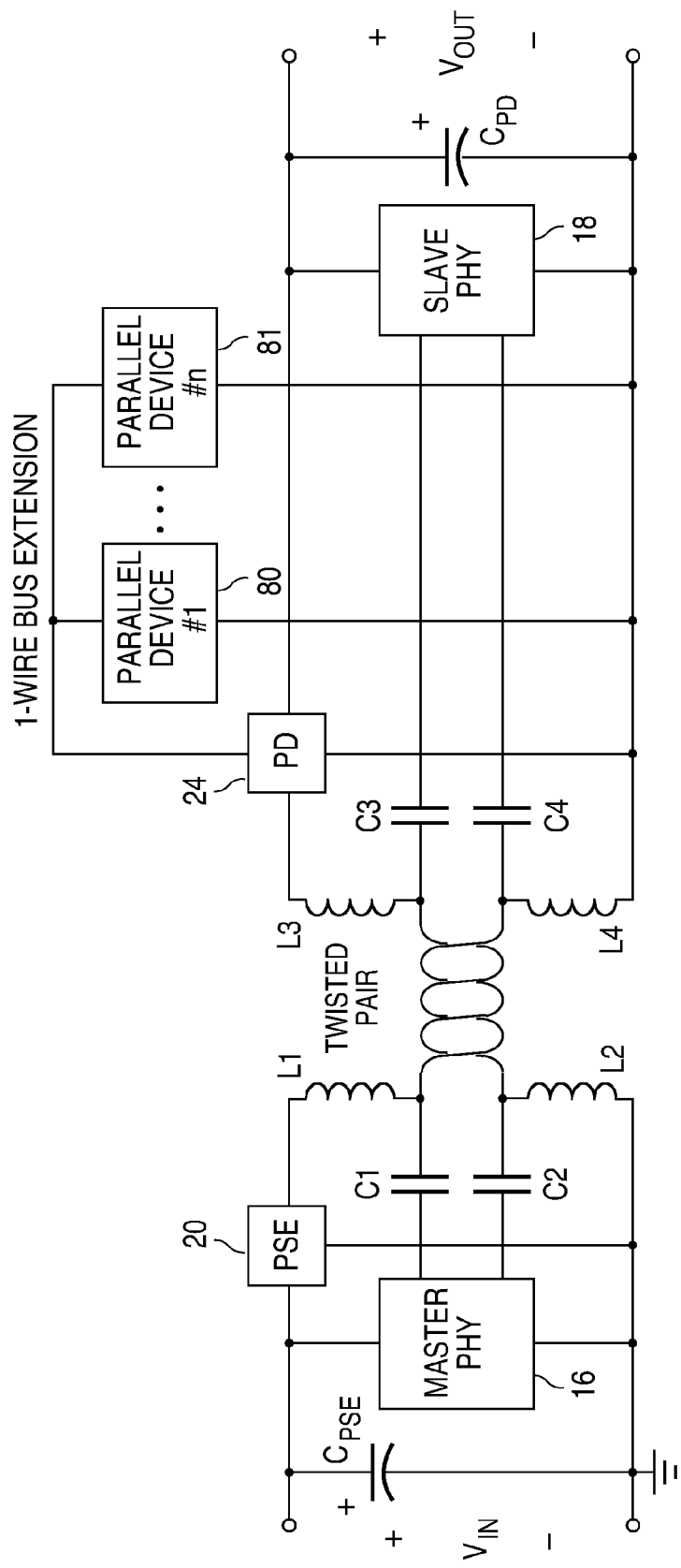
FIG. 4 illustrates a PoDL system where multiple PDs are connected in parallel, and the handshaking phase also includes the transmission of information to the PSE regarding the multiple PDs.

FIG. 4 illustrates an embodiment where the PSE 20 and PD 24 are similar to those in FIG. 2 but there are any number of additional devices 80 and 81 connected in parallel with the PD 24. All the parallel devices can be powered by the PSE 20 and all can communicate on the wire pair 14 using differential Ethernet data. All the parallel devices can use the serial 1-wire bus in the manner discussed above during the detection/classification phase or at times when the PHYs 16 and 18 are not powered.

The parallel devices 80 and 81 may be connected to the PSE/PD 1-wire bus via a switch controlled by the associated device. The devices 80 and 81 need not necessarily require power from the PSE to operate.

One example of a parallel device may be a non-volatile memory which is used as a repository for PD power class and PHY operating parameter information. Parallel bus devices may have unique addresses that allow communication independent from the PD 24. The PSE 20 may use the 1-wire bus protocol to determine the number of slave devices on the bus.

As seen, a low frequency data signal path (via inductors L1 and L3) is used by the PSE logic 30 and PD logic 32 during the low-power handshaking phase, and a separate high frequency, Ethernet differential data path is used by the master PHY 16 and slave PHY 18 (via capacitors C1-C4) during the normal operation. Therefore, the two paths effectively use frequency division multiplexing (FDM) to communicate data over the wire pair 14.

While particular embodiments of the present invention have been shown and described, it will be obvious to those skilled in the art that changes and modifications may be made without departing from this invention in its broader aspects and, therefore, the appended claims are to encompass within their scope all such changes and modifications.

What is claimed is:

1. A Power over Data Lines (PoDL) system for supplying power and data over a wire pair, the wire pair being a first wire and a second wire coupled to a Powered Device, the system comprising:
   a Power Sourcing Equipment (PSE) side of the wire pair, the PSE side comprising:
      a DC voltage source supplying a DC voltage;
      a first low pass filter coupled to the first wire;
      a first switch coupled between the DC voltage source and the first low pass filter for selectively coupling the DC voltage to the first wire;
      a first pull-up current source coupled to the first low pass filter at a first node;
      a first pull-down device coupled to the first node;
      a first control circuit controlling the first switch and the first pull-down device; and
      a first differential data transceiver coupled to the wire pair via a first high pass filter;
   a Powered Device (PD) side of the wire pair, the PD side comprising:
      a second low pass filter coupled to the first wire;
      a first capacitor coupled to the second low pass filter;
      a second pull-down device coupled to the second low pass filter;
      a second differential data transceiver coupled to the wire pair via a second high pass filter; and
      a second control circuit controlling the second pull-down device, wherein the first capacitor is coupled to a voltage input terminal of the second control circuit,
      wherein, prior to the first switch being closed for coupling the DC voltage source to the first wire, the first pull-up current source charges the first capacitor to an operating voltage of the second control circuit to power the second control circuit, and
      wherein the first control circuit and the second control circuit are configured to transmit and receive first serial data via the first wire by controlling the first pull-down device and the second pull-down device prior to the DC voltage source being applied to the first wire, such that the first pull-up current source provides power to operate the second control circuit while also being used to pull-up the first wire for transmitting serial data via the first wire.

2. The system of claim 1 further comprising a second switch coupled between the second low pass filter and a PD load, wherein the second control circuit closes the second switch and the first control circuit closes the first switch to couple the DC voltage source to the PD load subsequent to the first control circuit and the second control circuit transmitting and receiving the serial data for communicating operating characteristics at least regarding the PD load.

3. The system of claim 1 wherein the second differential transceiver is not powered by the operating voltage provided by the first capacitor when the first switch is off.

4. The system of claim 1 further comprising a shunt circuit coupled to the first capacitor for limiting the operating voltage provided by the first capacitor to a target voltage.

5. The system of claim 1 further comprising a voltage limiting device coupled to the first capacitor for limiting the voltage across the first capacitor to provide the operating voltage for the second control circuit.

6. The system of claim 1 wherein the first control circuit and the first differential data transceiver are powered from the DC voltage source.

7. The system of claim 1 wherein the second differential data transceiver is powered from the DC voltage source when the first switch is closed.

8. The system of claim 1 wherein the second differential transceiver is disabled until the second differential transceiver receives power from the DC voltage source when the first switch is closed.

9. The system of claim 1 wherein the first serial data comprise data for a detection and classification phase prior to the first switch being closed.

10. The system of claim 1 wherein, when the first differential data transceiver and the second differential data transceiver are enabled, the first differential data transceiver and the second differential data transceiver bidirectionally communicate differential data via the wire pair, the first high pass filter, and the second high pass filter.

11. The system of claim 10 wherein the first serial data is communicated between the first control circuit and the second control circuit, via the first low pass filter and the second low pass filter, while the first differential data transceiver and the second differential data transceiver bidirectionally communicate differential data via the wire pair, the first high pass filter, and the second high pass filter.

12. The system of claim 1 wherein at least two frequency division multiplexed channels are provided via the wire pair using the first serial data, conducted by the first low pass filter and the second low pass filter, and higher data rate Ethernet differential data signals transmitted by the first differential data transceiver and the second differential data transceiver via the first high pass filter and the second high pass filter.

13. The system of claim 1 wherein a first diode is coupled between the first capacitor and the second low pass filter.

14. A method performed by a Power over Data Lines (PoDL) system for supplying power and data over a wire pair, the wire pair being a first wire and a second wire coupled to a Powered Device, the method comprising:

Power Sourcing Equipment (PSE) providing a pull-up current to the first wire in the wire pair via a first low pass filter;

charging a first capacitor in the Powered Device (PD) by the pull-up current to achieve a desired operating voltage across the first capacitor;

coupling the first capacitor to an input voltage terminal of a first control circuit in the PD to operate the first control circuit;

controlling pull-down devices in the PD and PSE to selectively pull down the first wire to transmit first serial data between the first control circuit and a second control circuit in the PSE, the first serial data conveying operating characteristics of at least the PD;

only after the first serial data is processed by the PSE, coupling a DC voltage source to the first wire, via the first low pass filter, to supply operating power to the PD; and communicating between the PSE and the PD, using a first differential data transceiver in the PSE and a second differential data transceiver in the PD, via the wire pair and via high pass filters, such that the first serial data is communicated between the PSE and the PD, via the first low pass filter, and the first differential data transceiver and the second differential data transceiver bidirectionally communicate differential data via the wire pair and the high pass filters.

15. The method of claim 14 further comprising limiting the voltage across the first capacitor using a voltage limiting circuit.

16. The method of claim 14 wherein the first serial data comprises at least detection and classification data to determine whether to couple the DC voltage source across the first wire and second wire.

17. The method of claim 14 wherein the step of charging the first capacitor in the PD by the pull-up current comprises charging the first capacitor by the pull-up current via a second low pass filter in the PD coupled between the first wire and the first capacitor.

* * * * *